United States Patent
An

(10) Patent No.: US 12,054,979 B2
(45) Date of Patent: Aug. 6, 2024

(54) SYSTEM FOR CONTROLLING POWER TAIL GATE OF VEHICLE AND METHOD FOR CONTROLLING THEREOF

(71) Applicants: HYUNDAI MOTOR COMPANY, Seoul (KR); KIA MOTORS CORPORATION, Seoul (KR)

(72) Inventor: Daeyun An, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 786 days.

(21) Appl. No.: 17/145,671

(22) Filed: Jan. 11, 2021

(65) Prior Publication Data

US 2022/0056752 A1    Feb. 24, 2022

(30) Foreign Application Priority Data

Aug. 24, 2020    (KR) .................. 10-2020-0106325

(51) Int. Cl.
*E05F 15/76*   (2015.01)
*H04B 1/7163*  (2011.01)
*B60J 5/10*    (2006.01)

(52) U.S. Cl.
CPC ............ *E05F 15/76* (2015.01); *H04B 1/7163* (2013.01); *B60J 5/10* (2013.01); *E05Y 2400/36* (2013.01); *E05Y 2400/44* (2013.01); *E05Y 2400/52* (2013.01); *E05Y 2400/664* (2013.01); *E05Y 2400/856* (2013.01); *E05Y 2800/40* (2013.01); *E05Y 2900/546* (2013.01)

(58) Field of Classification Search
CPC ... E05F 15/76; H04B 1/7163; E05Y 2400/36; E05Y 2400/44; E05Y 2400/52; E05Y 2400/664; E05Y 2400/856; E05Y 2900/546
See application file for complete search history.

(56) References Cited

U.S. PATENT DOCUMENTS

| | | | | |
|---|---|---|---|---|
| 5,563,483 A | * | 10/1996 | Kowall | E05B 81/14 318/266 |
| 9,890,701 B2 | * | 2/2018 | Murphy | F02B 53/08 |
| 2003/0191568 A1 | * | 10/2003 | Breed | B60W 40/06 701/469 |
| 2013/0151071 A1 | * | 6/2013 | Lee | E05F 15/70 701/36 |
| 2015/0279131 A1 | * | 10/2015 | Nespolo | G08C 17/00 340/5.72 |
| 2015/0291126 A1 | * | 10/2015 | Nicholls | B60R 25/2054 701/49 |
| 2017/0154482 A1 | * | 6/2017 | Osborne | E05F 15/77 |
| 2018/0321758 A1 | * | 11/2018 | Serban | G06F 3/0325 |
| 2018/0371823 A1 | * | 12/2018 | Sugiura | B60Q 1/2661 |
| 2020/0291708 A1 | * | 9/2020 | Kimura | E05F 15/40 |

* cited by examiner

*Primary Examiner* — Gertrude Arthur Jeanglaude
(74) *Attorney, Agent, or Firm* — Morgan, Lewis & Bockius LLP

(57) ABSTRACT

A controlling method of a vehicle includes: detecting a location of a user around the vehicle in response to receiving opening closing signals for opening and closing a power tail gate of the vehicle, respectively; and controlling opening and closing speeds of the power tail gate according to a distance between the vehicle and the user when opening and closing the power tail gate, respectively, in response to receiving the respective opening and closing signals of the power tail gate.

23 Claims, 10 Drawing Sheets

FIG. 5

| DIVISION | DISTANCE | METHOD |
|---|---|---|
| LAMP | PROXIMITY | FLASHING AT HIGH SPEED |
| | NEAR | FLASHING AT NORMAL SPEED |
| | SAFETY DISTANCE | KEEP LIGHTING |
| COLOR | PROXIMITY | RED |
| | NEAR | YELLOW |
| | SAFETY DISTANCE | WHITE |
| SOUND (VOLUME) | PROXIMITY | LOUD |
| | NEAR | MIDDLE |
| | SAFETY DISTANCE | SMALL |

SYSTEM FOR CONTROLLING POWER TAIL GATE OF VEHICLE AND METHOD FOR CONTROLLING THEREOF

CROSS-REFERENCE TO RELATED APPLICATION(S)

The present application claims the benefit of priority to Korean Patent Application No 10-2020-0106325, filed on Aug. 24, 2020 in the Korean Intellectual Property Office, the entire contents of which is incorporated herein for all purposes by this reference.

TECHNICAL FIELD

The present disclosure relates to a vehicle, and more particularly, to a vehicle having a power tail gate that is automatically opened and closed by driving a motor.

BACKGROUND

A vehicle is equipped with several doors. Most of the doors are provided on the side of the vehicle and are used by passengers to get on/off. In a case of a sedan type passenger car, a trunk door is provided at the rear of the vehicle. Other type of vehicle such as a SUV (Sports Utility Vehicle), RV (Recreation Vehicle), or van has a tail gate at the rear side thereof. In the case of a vehicle equipped with a tail gate, the user can directly open or close the tail gate by hand. In addition, in the case of a power tail gate that automatically opens or closes using the driving force of a motor, the power tail gate can be automatically opened or closed by only operating or carrying a remote controller.

However, when the power tail gate is automatically opened or closed, there is a possibility that a user may come into contact with the open or closed power tail gate if the user is located at the rear of the vehicle.

SUMMARY

According to an aspect of the present disclosure, the purpose of the disclosure is to control the opening or closing speed of the power tail gate in consideration of the user's position when the power tail gate of the vehicle is automatically opened or closed.

In accordance with an aspect of the present disclosure, a controlling method of a vehicle may include: detecting a location of a user around the vehicle in response to receiving opening and closing signals for opening and closing a power tail gate of the vehicle, respectively; and controlling opening and closing speeds of the power tail gate differently according to a distance between the vehicle and the user when respectively opening and closing the power tail gate in response to receiving the opening and closing signals of the power tail gate, respectively.

The method may further include controlling the opening or closing speed of the power tail gate slower as the distance between the vehicle and the user is closer; and controlling the opening or closing speed of the power tail gate faster as the distance between the vehicle and the user is far.

The method may further include recognizing the user's motion; and further reducing or increasing the opening or closing speed of the power tail gate based on the user's motion recognition result.

The method may further include calculating a moving speed of the user based on the location information of the user; and further reducing or increasing the opening or closing speed of the power tail gate based on the moving speed of the user.

The method may further include displaying the opening or closing speed of the power tail gate through a visual expression means or an audible expression means provided in the vehicle.

The displaying may include expressing by turning on and off the lights of the vehicle; and displaying by the audible expression means provided on the vehicle may include expressing through a speaker or horn of the vehicle.

The method may further include checking whether other person other than the user presents at the rear of the vehicle; and stopping the opening and closing of the power tail gate or controlling the opening and closing of the power tail gate to be slower when the other person is present at the rear of the vehicle.

The detection of the presence of the other person may be through a rear detection sensor of the vehicle.

The detection of the location of the user may be through an ultra-wideband communication between the vehicle and the ultra-wideband communicator carried by the user.

In accordance with another aspect of present disclosure, a vehicle may include: a communicator configured to receive opening and closing signals of a power tail gate of the vehicle; a controller configured to detect a location of a user around the vehicle in response to receiving the opening and closing signals for opening and closing the power tail gate, respectively, and to control opening and closing speeds of the power tail gate according to a distance between the vehicle and the user when respectively opening and closing the power tail gate in response to the opening and closing signals of the power tail gate, respectively.

The controller may be configured to control the opening or closing speed of the power tail gate slower as the distance between the vehicle and the user is closer and control the opening or closing speed of the power tail gate faster as the distance between the vehicle and the user is far.

The controller may be configured to recognize the user's motion and further reduce or increase the opening or closing speed of the power tail gate based on the user's motion recognition result.

The controller may be configured to calculate a moving speed of the user based on the location information of the user; and further reduce or increase the opening or closing speed of the power tail gate based on the moving speed of the user.

The controller may be configured to display the opening or closing speed of the power tail gate through a visual expression means or an audible expression means provided in the vehicle.

The opening and closing speed can be displayed by expressing by turning on and off the lights of the vehicle; and displaying by the audible expression means provided on the vehicle may include expressing through a speaker or horn of the vehicle.

The controller is configured to check whether other person other than the user presents at the rear of the vehicle; and stop the opening and closing of the power tail gate or control the opening and closing of the power tail gate to be slower when the other person is present at the rear of the vehicle.

The presence of the other person may be detected through a rear detection sensor of the vehicle.

The location of the user may be detected through an ultra-wideband communication between the vehicle and the ultra-wideband communicator carried by the user.

In accordance with another aspect, a controlling method of a vehicle may include: communicating with an ultra-wideband communicator of a user through ultra-wideband communication; detecting a location of the user having the ultra-wideband communicator around the vehicle through the ultra-wideband communication in response to an receiving opening closing signals for opening and closing a power tail gate of the vehicle, respectively, generated from the ultra-wideband communicator; and controlling opening and closing speeds of the power tail gate according to a distance between the vehicle and the user when opening and closing the power tail gate, respectively, in response to the respective opening and closing signals of the power tail gate.

In accordance with another aspect, a vehicle may include: a communicator configured to communicate with an ultra-wideband communicator of a user through ultra-wideband communication, and receive opening and closing signals of a power tail gate of the vehicle; a controller configured to detect a location of the user having the ultra-wideband communicator around the vehicle through the ultra-wideband communication in response to receiving the opening and closing signals for opening and closing the power tail gate of the vehicle, respectively, generated from the ultra-wideband communicator, and control an opening or closing speed of the power tail gate slower as a distance between the vehicle and the user becomes closer and control the opening or closing speed of the power tail gate faster as the distance between the vehicle and the user becomes farther.

BRIEF DESCRIPTION OF THE DRAWINGS

FIG. 5 is a diagram illustrating an example of intuitive display of a vehicle control method according to an embodiment of the present disclosure.

DETAILED DESCRIPTION

Figure 1:
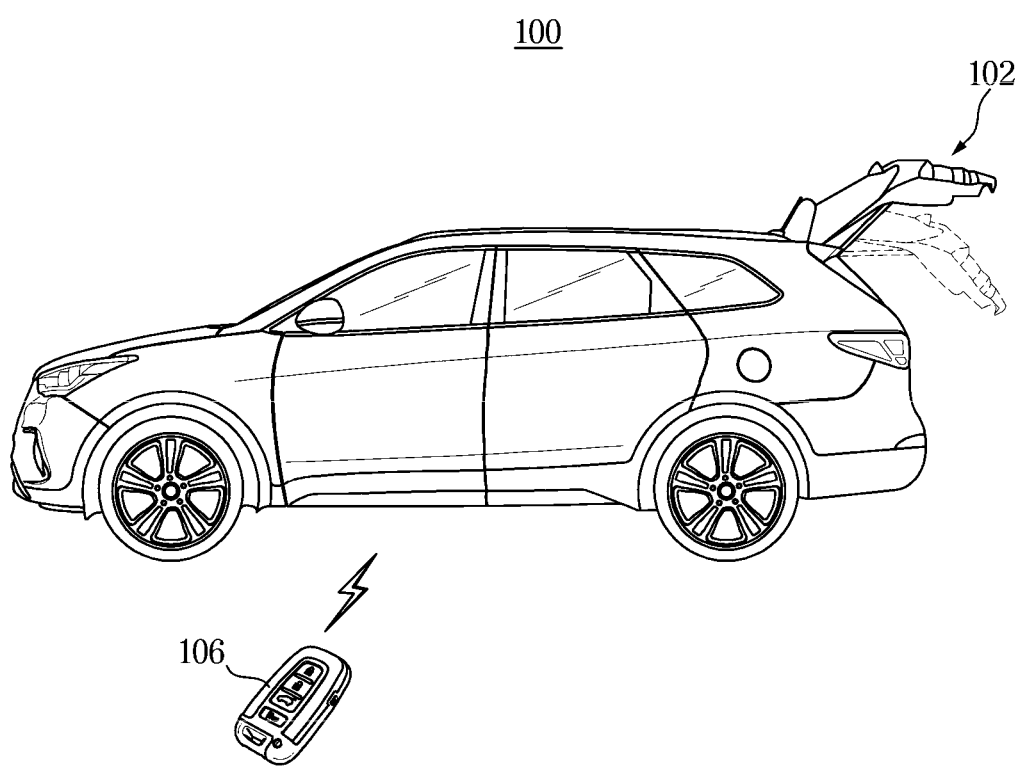
FIG. 1 is a diagram illustrating a vehicle according to an embodiment of the present disclosure.

FIG. 1 is a diagram illustrating a vehicle according to an embodiment of the present disclosure.

A vehicle 100 is equipped with several doors. Most of the doors are provided on the side of the vehicle 100 and are used by passengers to get on/off. In the case of a sedan type passenger car, a trunk door is provided at the rear of the vehicle, but a door called a tail gate is provided at the rear of the vehicle in a SUV (Sports Utility Vehicle), RV (Recreation Vehicle), or a van. The vehicle 100 shown in FIG. 1 is an SUV equipped with a power tail gate 102. The tail gate 102 can be opened and closed manually by the user. In addition, the power tail gate 102 shown in FIG. 1 can be opened and closed automatically through the driving force of the motor. The power tail gate 102 is opened and closed by a driving force of a motor that is driven in response to a button operation by a user or a user detection by a sensor provided in the vehicle 100. To this end, the power tail gate 102 includes driving elements such as a latch, an actuator, and a motor.

Another way to automatically open and close the power tail gate 102, is a method of automatically opening and closing the power tail gate 102 by operating a button provided on the remote controller (aka smart key) 106 of the vehicle 100. When the user wants to open or close the power tail gate 102 while not in the vehicle 100, the power tail gate 102 is automatically activated by operating a button of the remote controller 106 carried by the user.

Figure 3A:
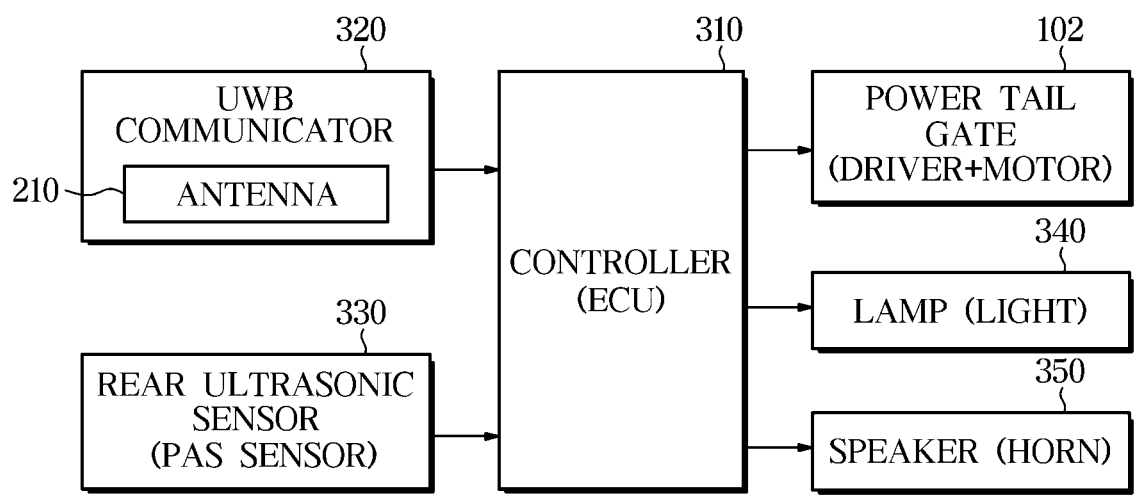
FIGS. 3A and 3B are diagrams illustrating a control system of a vehicle according to an embodiment of the present disclosure.
Figure 3B:

As another way to automatically open and close the power tail gate 102, when a user approaches the vehicle 100 within a certain distance while carrying the remote controller 106 of the vehicle 100, the detection means provided in the vehicle 100 detects the approach of the remote controller 106 through communication, in response to this detection, a controller 310 in FIGS. 3A and 3B controls the power tail gate 102 to open or close. In the open state of the power tail gate 102, when a user carrying the remote controller 106 deviates from the vehicle 100 by a predetermined distance, the power tail gate 102 may be automatically closed. In the present disclosure, the controller 310 may be a processor or a control unit such as an electronic control unit (ECU) configurable to control electrical systems in a vehicle.

As described above, when the power tail gate 102 of the vehicle 100 automatically opens and closes, the speed at which the power tail gate 102 opens and closes (operation speed) may be an important consideration. That is, when the power tail gate 102 is automatically opened and closed, the operating speed needs to be an appropriate speed that meets the needs of the user. In an embodiment of the present disclosure, the user's convenience is achieved by appropriately controlling the opening or closing speed of the power tail gate 102 according to the distance between the vehicle 100 and the user.

Figure 2:
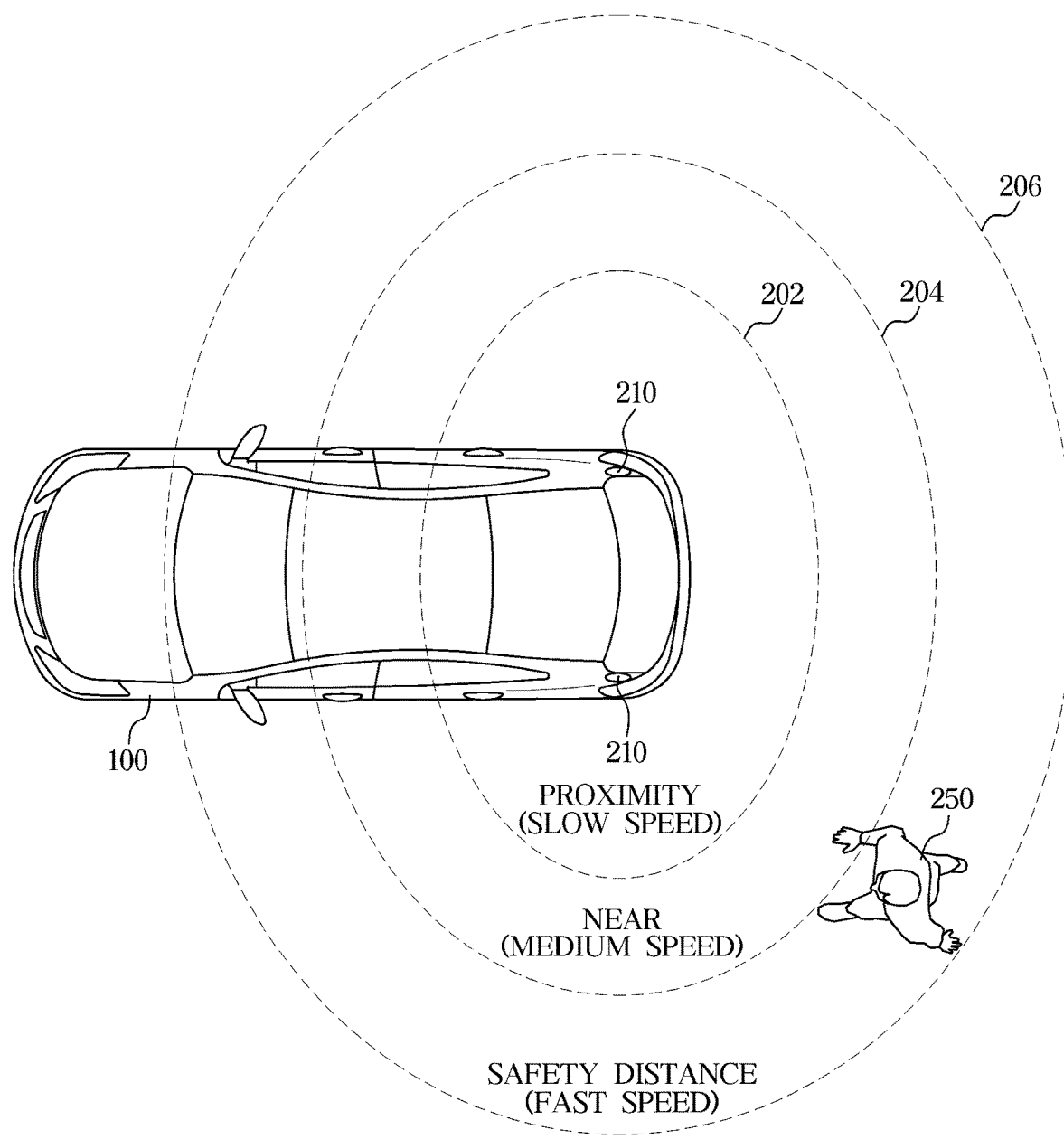
FIG. 2 is a diagram illustrating detection of a user location of a vehicle according to an embodiment of the present disclosure.

FIG. 2 is a diagram illustrating detection of a user location of a vehicle according to an embodiment of the present disclosure.

As shown in FIG. 2, the vehicle 100 according to the embodiment is provided with an antenna 210 for ultra-wideband (UWB) communication. The ultra-wideband communication antenna 210 communicates with an ultra-wideband communicator carried by the user 250. The ultra-wideband communicator may include the vehicle remote controller 106, a mobile communication terminal, or other devices capable of performing ultra-wideband communication. Through this communication, the vehicle 100 can measure the location of the user 250 carrying the ultra-wideband communicator. In addition, the relative distance between the vehicle 100 and the user 250 as well as the moving direction of the user 250 may be determined from the result of measuring the location of the user 250. For this, the communication function and radar function of the ultra-wideband communication technology can be used. This will be described in more detail in the description of FIGS. 3A and 3B to be described later.

In FIG. 2, reference numerals 202, 204, and 206 denote a set section (or range) that is a reference for adjusting the opening or closing speed of the power tail gate 102. That is, in an embodiment of the present disclosure, depending on how far the location of the user 250 carrying the ultra-wideband communicator is from the vehicle 100 (that is, according to the relative distance), the power tail gate of the vehicle 100 Regulates the opening speed or closing speed of (102).

For example, when the user 250 is located within a preset close section (proximity) 202 from the vehicle 100, the opening or closing speed of the power tail gate 102 is controlled to a preset slow speed. On the contrary, when the user 250 is located within a predetermined distance (safety) 206 from the vehicle 100, the opening or closing speed of the power tail gate 102 is controlled at a preset high speed. If the user 250 is located in the middle section (periphery) 204 between the near section 202 and the far section 206, the opening or closing speed of the power tail gate 102 is set between the slow speed and the fast speed as medium speed. Here, 'slow speed' and 'fast speed' are relative and may be speeds determined based on results obtained by conducting experiments in various environments in advance for safety and convenience of the user 250.

FIGS. 3A and 3B are diagrams illustrating a control system of a vehicle according to an embodiment of the present disclosure.

As shown in FIG. 3A, an ultra-wideband communicator 320 and a rear ultrasonic sensor 330 are connected to the input side of the controller 310 to enable communication. The ultra-wideband communicator 320 performs communication with an ultra-wideband module, and for this purpose, the ultra-wideband communicator 320 includes an antenna 210 for ultra-wideband communication as previously described with reference to FIG. 2. In the present disclosure, the ultra-wideband communicator 320 or the ultra-wideband communicator 320 may be a hardware device capable of transmitting a signal over communication wire or wirelessly.

Rear ultrasonic sensor 330 is a sensor for a parking assistance system (Parking Assistance System), and is installed on the rear bumper of the vehicle 100 to measure the distance between an obstacle (or person) located at the rear of the vehicle 100 and the rear of the vehicle 100 when the vehicle 100 is parked. When the distance between an obstacle (or person) located at the rear of the vehicle 100 and the rear of the vehicle 100 reaches within a preset distance, an alarm sound is generated inside the vehicle 100 to draw attention of the driver. Using such a rear ultrasonic sensor 330 can detect the presence of a person located at the rear of the vehicle 100 regardless of whether an ultra-wideband communicator (for example, the remote controller 106) is carried.

The power tail gate 102 of the vehicle 100, a lamp (light) 340, and a speaker 350 are connected to the output side of the controller 310 to enable communication. The latches, actuators, and motors of the power tail gate 102 are driven under the control of the controller 310. The lamp (light) 340 is an example of an output device as a visual expression means provided in the vehicle 100, and may be a lighting type including at least one of a headlight, a taillight, a fog light, a daytime running light, an interior light, or a brake light. The speaker 350 is an output device as an audible expression means installed inside the vehicle 100 and may be a speaker or a warning horn.

Ultra-wideband (UWB) communication technology is widely used as radar as well as ultra-high-speed data communication. The ultra-high speed data communication of the ultra-wideband communication technology makes it possible to secure a sufficient time margin for controlling the opening or closing speed of the power tail gate 102 by detecting the user 250 approaching the vehicle 100 from a distance not far from the vehicle 100. In addition, the radar to which the ultra-wideband communication technology is applied can accurately measure the location (distance) of the detection target (for example, the user 250) by effectively filtering out the influence of the environment such as weather through noise filtering. FIG. 3B shows an example of signal division in the ultra-wideband communication technology. As shown in FIG. 3B, communication data and radar data can be transmitted in a time division manner.

Figure 4:
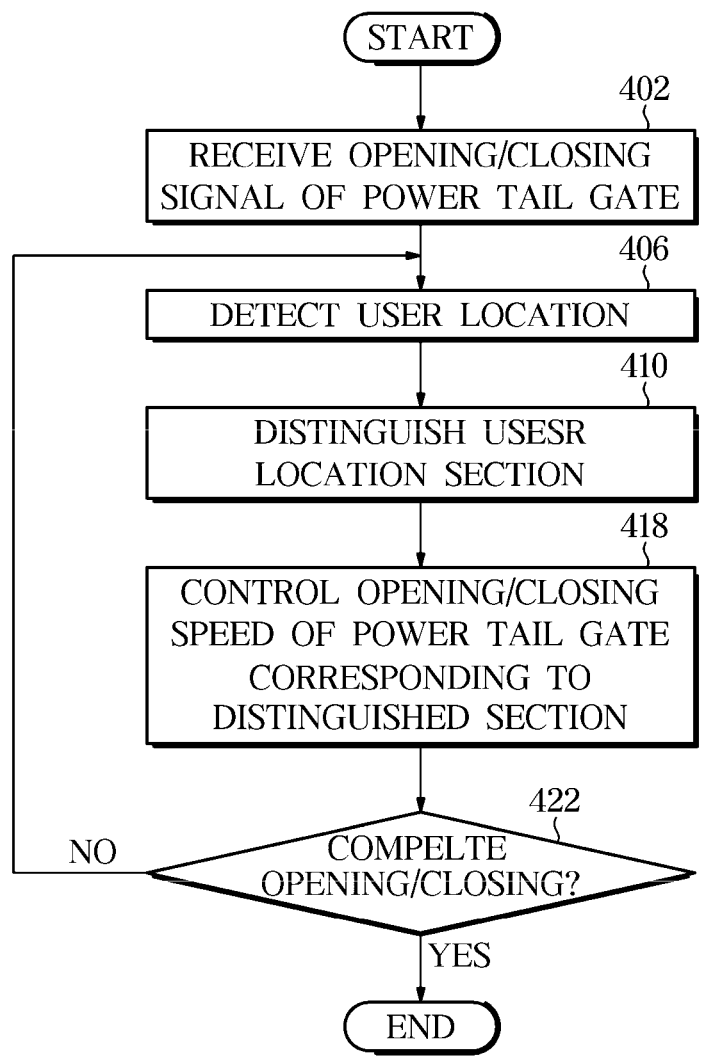
FIG. 4 is a diagram illustrating a first embodiment of a vehicle control method according to an embodiment of the present disclosure.

FIG. 4 is a diagram illustrating a first embodiment of a vehicle control method according to an embodiment of the present disclosure.

As shown in FIG. 4, the controller 310 receives a power tail gate open/close signal generated from the remote controller 106, which is one of the ultra-wideband communicators (402). The power tail gate open/close signal generated by the remote controller 106 is, a signal generated by the user 250 operating a button of the remote controller 106, or the signal generated by the remote controller 106 carried by the user 250 by communication made by approaching the vehicle 100 within a preset distance.

When the power tail gate open/close signal generated from the remote controller 106 is received, the controller 310 measures the location (or distance) of the user 250 (406). The location (distance) of the user 250 is strictly a location (distance) of the ultra-wideband communicator (e.g., the remote controller 106) carried by the user 250. The distance is the distance between the user 250 and the vehicle 100.

When the location measurement of the user 250 is completed, the controller 310 determines a section to which the location of the user 250 belongs (410). For example, the controller 310 determines which section of the user 250 is located among the near section 202, the middle section 204, and the far section 206 shown in FIG. 2.

When the determination of the section in which the user 250 is located is completed, the controller 310 controls the speed of opening or closing of the power tail gate 102 to correspond to the determined section (418). For example, when the user 250 is located within a preset close section 202 from the vehicle 100, the opening or closing speed of the power tail gate 102 is controlled at a preset slow speed. On the contrary, when the user 250 is located within a predetermined distance section 206 from the vehicle 100, the opening or closing speed of the power tail gate 102 is controlled at a preset high speed. When the user 250 is located in the middle section 204 between the near section 202 and the far section 206, the controller 310 controls the speed of opening or closing of the power tail gate 102 to a speed intermediate between the slow speed and the high speed.

When the opening and closing of the power tail gate 102 is completed, the controller 310 ends the opening and closing control of the power tail gate 102 ('Yes' in 422). On the other hand, if the opening and closing of the power tail gate 102 has not yet been completed, the controller 310 returns to the user location measurement step 406 and repeats the following series of processes ('No' in 422).

Through such control, the user's convenience can be achieved by appropriately controlling the opening or closing speed of the power tail gate 102 according to the distance between the vehicle 100 and the user 250.

FIG. 5 is a diagram illustrating an example of intuitive display of a vehicle control method according to an embodiment of the present disclosure.

As shown in FIG. 5, with control of the opening or closing speed of the power tail gate 102 according to the distance between the vehicle 100 and the user, as an additional method for visually and audibly displaying the current driving speed of the power tail gate 102, lighting of lights and volume of sound can be used.

The lighting state of the lamp (light) 340 may be differentiated according to the section in which the user 250 is located. For example, if the user 250 is located within a preset close section (proximity) 202 from the vehicle 100, the lamp (light) 340 flashes at a high speed to draw the attention of the user 250. In addition, when the user 250 is located within a preset intermediate section (near) 204 from the vehicle 100, the user 250's attention is drawn by flashing the lamp (light) 340 at a normal speed. Further, if the user 250 is located in a preset remote section (safety distance) 206 from the vehicle 100, the user 250 is a safe location by maintaining the lamp (light) 340 in the lit state.

Alternatively, the lighting color of the lamp (light) 340 may be differentiated according to the section in which the user 250 is located. For example, if the user 250 is located within a preset close section (proximity) 202 from the vehicle 100, the lamp (light) 340 is lit in red to draw the user 250's attention. In addition, when the user 250 is located in the middle section (near) 204 set in advance from the vehicle 100, the lamp (light) 340 is lit in yellow to draw the user 250's attention. Further, for example, if the user 250 is located within a predetermined distance (safety) 206 from the vehicle 100, by lighting the lamp (light) 340 in white, it is possible to inform that the user 250 is in a safe distance.

Alternatively, according to the section in which the user 250 is located, the volume of the sound may be differentiated. For example, when the user 250 is located within a preset close section (proximity) 202 from the vehicle 100, a loud warning sound is output through the speaker 350 to call the user 250's attention. Further, when the user 250 is located within a preset intermediate section (near) 204 from the vehicle 100, a warning sound of an intermediate volume is output through the speaker 350 to draw the attention of the user 250. In addition, if the user 250 is located within a predetermined distance (safety distance) 206 from the vehicle 100, a warning sound of a small volume is output through the speaker 350 so that the controller may announce user 250 is in a safe location.

The display of the driving speed of the power tail gate 102 through the lighting type or lighting color of the lamp, or the volume of the warning sound may be used in combination of two or more as necessary.

Figure 6:
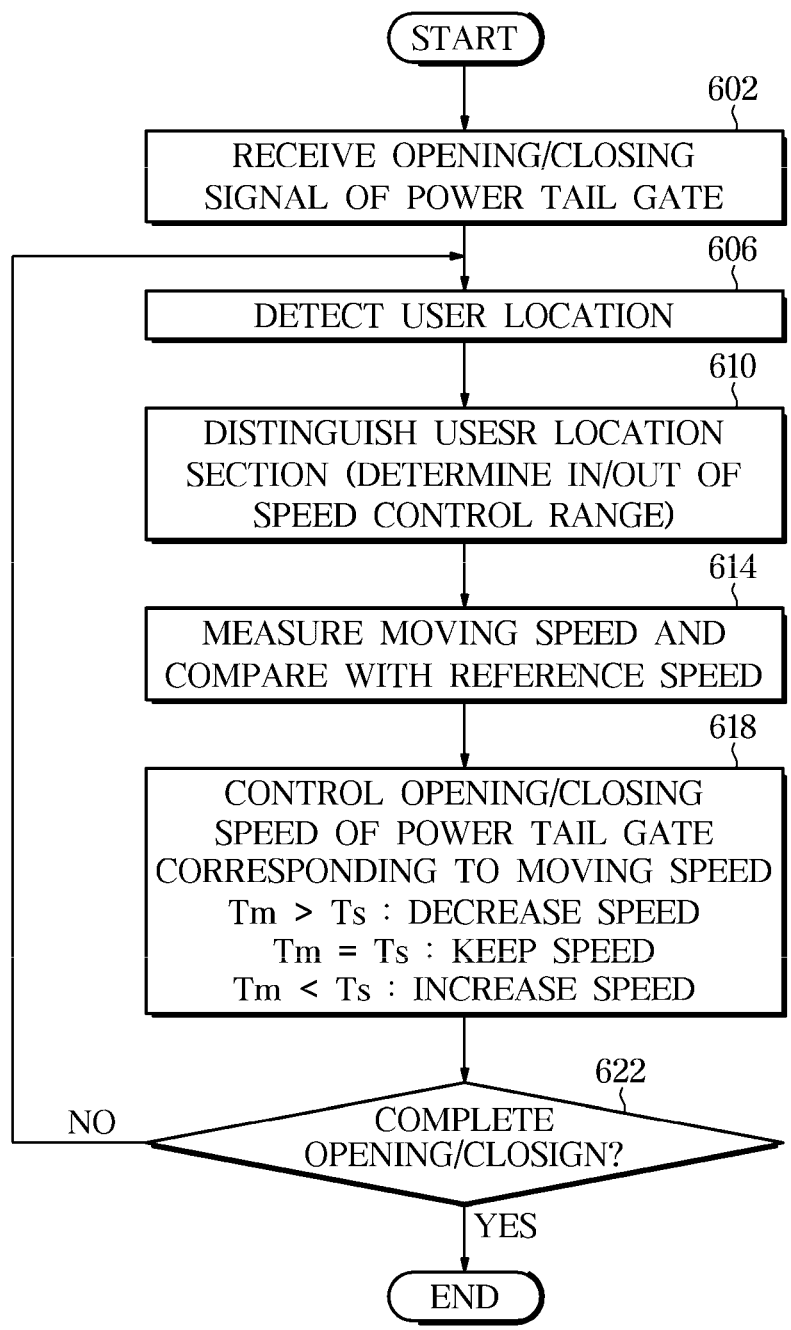
FIG. 6 is a view illustrating a second embodiment of a vehicle control method according to an embodiment of the present disclosure.

FIG. 6 is a view illustrating a second embodiment of a vehicle control method according to an embodiment of the present disclosure.

As shown in FIG. 6, the controller 310 receives a power tail gate opening/closing signal generated from the remote controller 106, which is one of the ultra-wideband communicators (602). The power tail gate open/close signal generated by the remote controller 106 is a signal generated by the user 250 operating a button of the remote controller 106, or the signal automatically generated by communication made by approaching the vehicle within a preset distance by the user 250.

When the power tail gate open/close signal generated by the remote controller 106 is received, the controller 310 measures the location (or distance) of the user 250 (606). The location (distance) of the user 250 is strictly the location (distance) of the ultra-wideband communicator (e.g., the remote controller 106) carried by the user 250. The distance here is a distance between the user 250 and the vehicle 100.

When the location measurement of the user 250 is completed, the controller 310 determines a section to which the location of the user 250 belongs (610). For example, the controller 310 determines which section of the user 250 is located among the near section 202, the middle section 204, and the far section 206 shown in FIG. 2. In addition, in this step, it is determined whether the section in which the user 250 is located falls within the speed control target range of the power tail gate 102 or out of the speed control range. The 'speed control range' is an area very close to the power tail gate 102 that can ensure the minimum safety of the user 250, and the power shown in FIG. 6 is only when the user 250 is located outside the 'speed control range'. Both the communication function and the radar function of the ultra-wideband communicator 320 may be used to more accurately determine whether the user 250 is within the speed control range.

The controller 310 measures the moving speed by using the position measurement of the user 250 and compares it with the reference speed (614). That is, the controller 310 may measure the moving speed of the user 250 through the time Tm that the user 250 has moved between two different points. The controller 310 compares the measured travel time (Tm) with a predetermined reference time (Ts).

When the determination of the section in which the user 250 is located and the comparison of the moving time (Tm) and the reference time (Ts) of the user 250 are completed, the controller 310 controls the opening or closing speed of the power tail gate 102 to correspond to the comparison result of the travel time (618). For example, when the user 250 is located within a preset close section 202 from the vehicle 100, the opening or closing speed of the power tail gate 102 is controlled at a preset slow speed. On the contrary, when the user 250 is located within a predetermined distance section 206 from the vehicle 100, the opening or closing speed of the power tail gate 102 is controlled at a preset high speed. If the user 250 is located in the middle section 204 between the near section 202 and the far section 206, the opening or closing speed of the power tail gate 102 is controlled by an intermediate speed between a slow speed and a high speed. If the moving time (Tm) of the user 250 is greater than the reference time (Ts), the controller 310 determines that the user 250 quickly approaches the vehicle 100 and secures the safety of the user 250 and reduces the speed of opening or closing of the power tail gate 102.

Otherwise, if the moving time (Tm) of the user 250 and the reference time (Ts) are the same, the controller 310 determines that the user 250 approaches the vehicle 100 at a predetermined general speed, and maintains the opening or closing speed of the power tail gate 102 at the predetermined speed. Alternatively, if the moving time Tm of the user 250 is less than the reference time Ts, the controller 310 determines that the user 250 approaches the vehicle 100 relatively slowly and increases the speed of opening or closing of the power tail gate 102. When the user 250 slowly approaches the vehicle 100, the controller may determine that the user 250 is far enough away from the power tail gate 102 and increases the opening or closing speed of the power tail gate 102 to quickly open or close.

When the opening and closing of the power tail gate 102 is completed, the controller 310 ends the opening and closing control of the power tail gate 102 ('Yes' in 622). On the other hand, when the opening and closing of the power tail gate 102 has not yet been completed, the controller 310 returns to the user position measurement step 406 and repeats the following series of processes ('No' in 622).

Through such control, the user's convenience is achieved by appropriately controlling the opening or closing speed of the power tail gate 102 according to the moving time (speed) of the user 250 relative to the vehicle 100.

Figure 7:
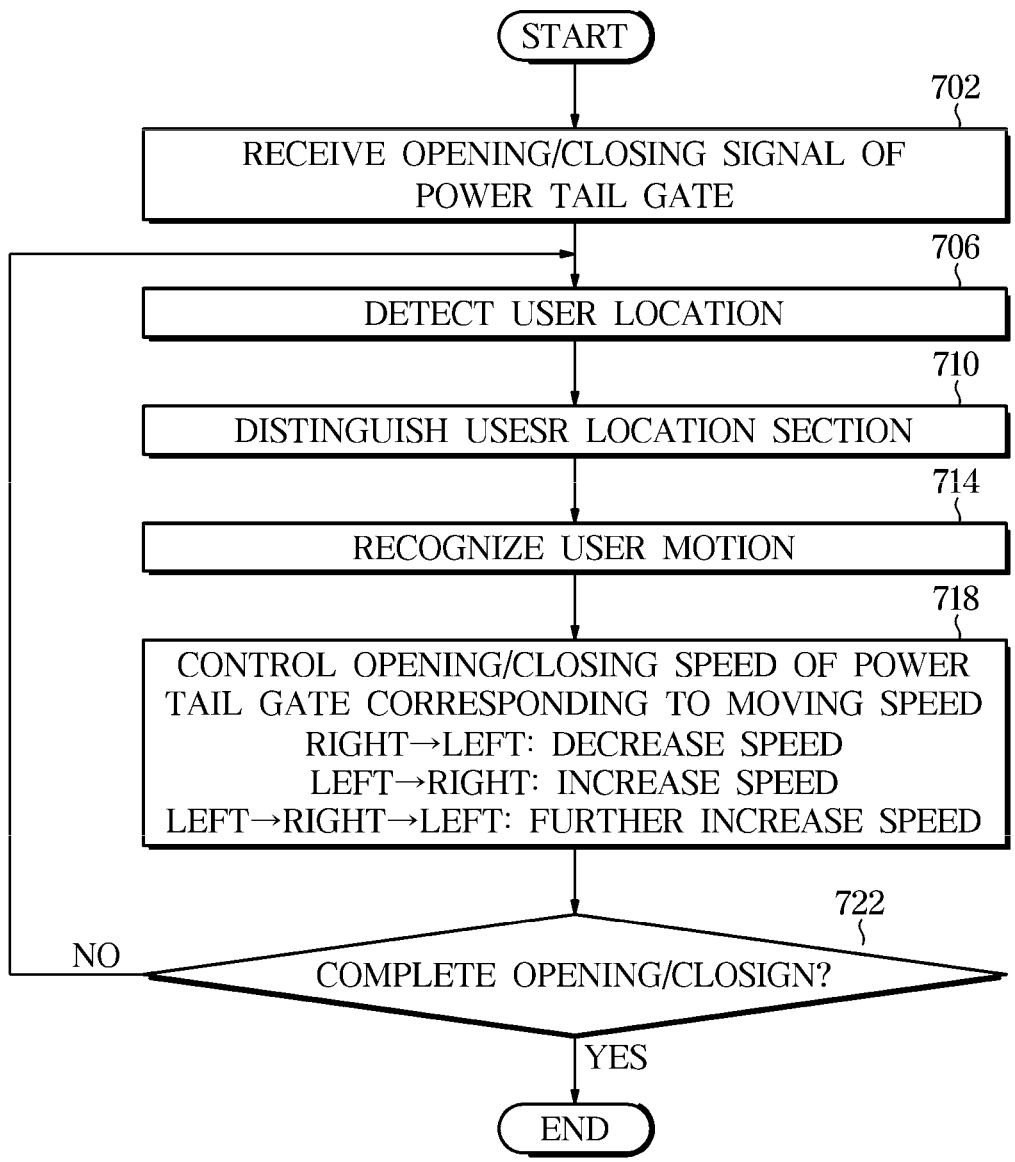
FIG. 7 is a view illustrating a third embodiment of a vehicle control method according to an embodiment of the present disclosure.

FIG. 7 is a view illustrating a third embodiment of a vehicle control method according to an embodiment of the present disclosure.

As shown in FIG. 7, the controller 310 receives a power tail gate open/close signal generated from the remote controller 106, which is one of the ultra-wideband communicators (702). The power tail gate opening/closing signal generated by the remote controller 106 is a signal generated by the user 250 operating a button of the remote controller 106, or a signal automatically generated by communication made when the remote controller 106 carried by the user 250 approaches within a preset distance from the vehicle 100.

When the power tail gate open/close signal generated by the remote controller 106 is received, the controller 310 measures the location (or distance) of the user 250 (706). The location (distance) of the user 250 is strictly the location (distance) of the ultra-wideband communicator (e.g., the remote controller 106) carried by the user 250. Here, the distance is a distance between the user 250 and the vehicle 100.

When the location measurement of the user 250 is completed, the controller 310 determines a section to which the location of the user 250 belongs (710). For example, the controller 310 determines which section of the user 250 is located among the proximity section 202, the near section 204, and the far section 206 shown in FIG. 2.

In addition, the controller 310 recognizes the operation of the user 250 (714). Here, the motion of the user 250 may be the direction of movement of the user 250. For example, the controller 310 recognizes whether the user 250 moves in a straight line or a trajectory close to a straight line while approaching the vehicle 100, or moves while changing directions to the left or right. The controller 310 uses the result of motion recognition of the user 250 to control the speed of the power tail gate 102. Both the communication function and the radar function of the ultra-wideband communicator 320 may be used to recognize the motion of the user 250.

When the determination of the section in which the user 250 is located and recognition of the motion of the user 250 is completed, the controller 310 controls the speed of opening or closing of the power tail gate 102 to correspond to the result of the user 250's motion recognition (718).

Figure 8:
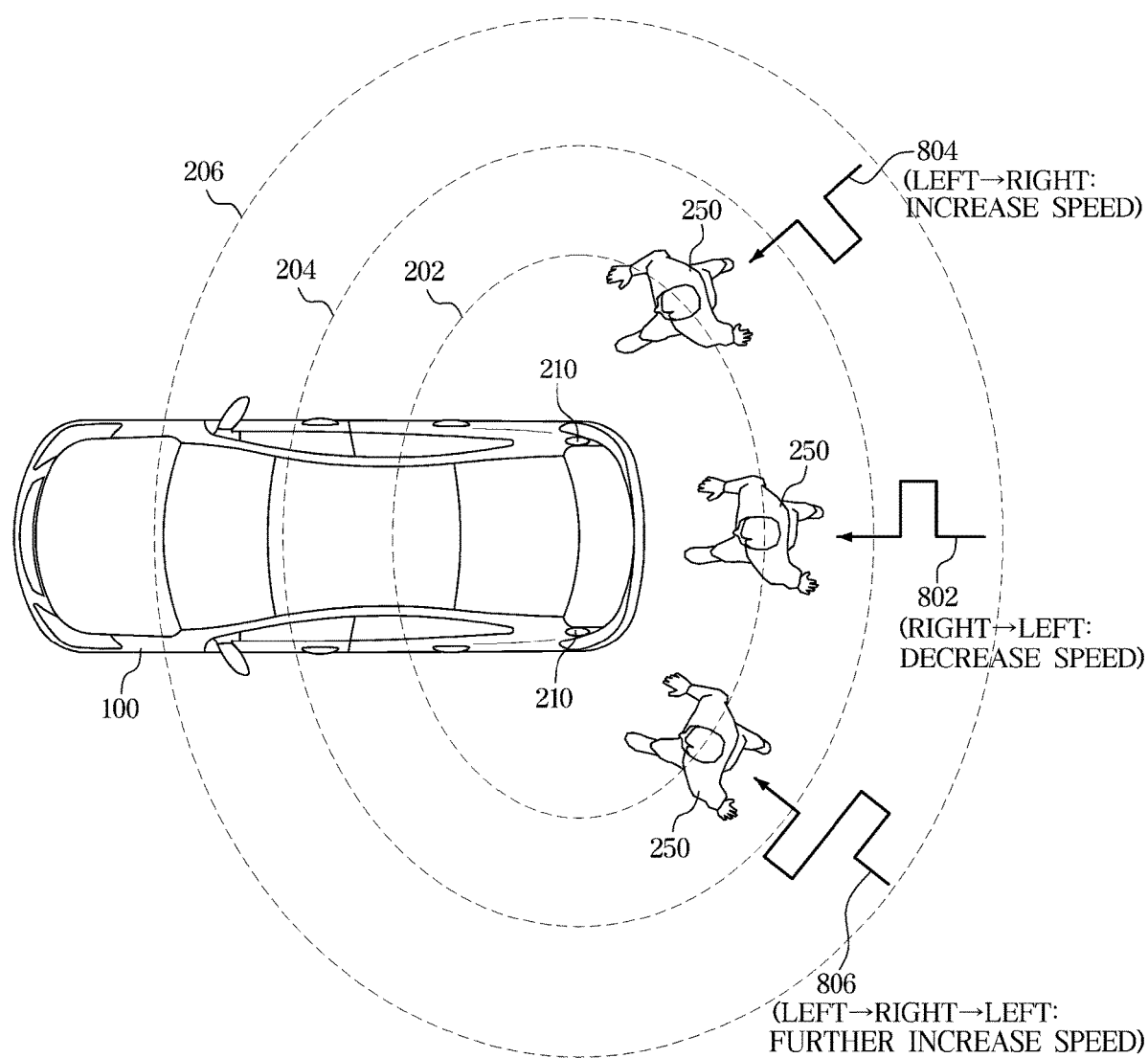
FIG. 8 is a diagram illustrating various embodiments of user's gesture recognition in the vehicle control method shown in FIG. 7.

FIG. 8 is a diagram illustrating various embodiments of user's gesture recognition in the vehicle control method shown in FIG. 7. Reference numeral 802 of FIG. 8 indicates that the user 250 changes the direction in the right-left order in the middle of going straight and then goes straight again. In this case, the controller 310 reduces the speed of opening or closing of the power tail gate 102, as promised in advance. Reference numeral 804 of FIG. 8 indicates that the user 250 changes directions in the order of left-right in the middle of going straight and then goes straight again. In this case, the controller 310 increases the speed of opening or closing of the power tail gate 102, as previously promised. As another aspect of the motion recognition of the user 250 for controlling the operation speed of the power tail gate 102, as shown at 806 in FIG. 8, the controller 310 may increase the speed of opening or closing of the power tail gate 102 more rapidly through more complex operations in the order of left-right-left in the middle of the user 250 going straight.

The operation shown by reference numerals 802, 804, and 806 of FIG. 8 is to reduce the speed of opening or closing of the power tail gate 102, and may be predetermined by the manufacturer of the vehicle 100. The operation of the user 250 and the control of the driving speed of the power tail gate 102 according to this promise are not limited to those shown in FIG. 8 and may be configured in other aspects.

Returning to FIG. 7, when the opening and closing of the power tail gate 102 is completed, the controller 310 ends the opening and closing control of the power tail gate 102 ('Yes' in 722). On the other hand, when the opening and closing of the power tail gate 102 has not yet been completed, the controller 310 returns to the user position measurement step 406 and repeats the following series of processes ('No' in 722).

Through such control, the user's convenience is achieved by appropriately controlling the opening or closing speed of the power tail gate 102 according to the moving time (speed) of the user 250 relative to the vehicle 100.

Figure 9:
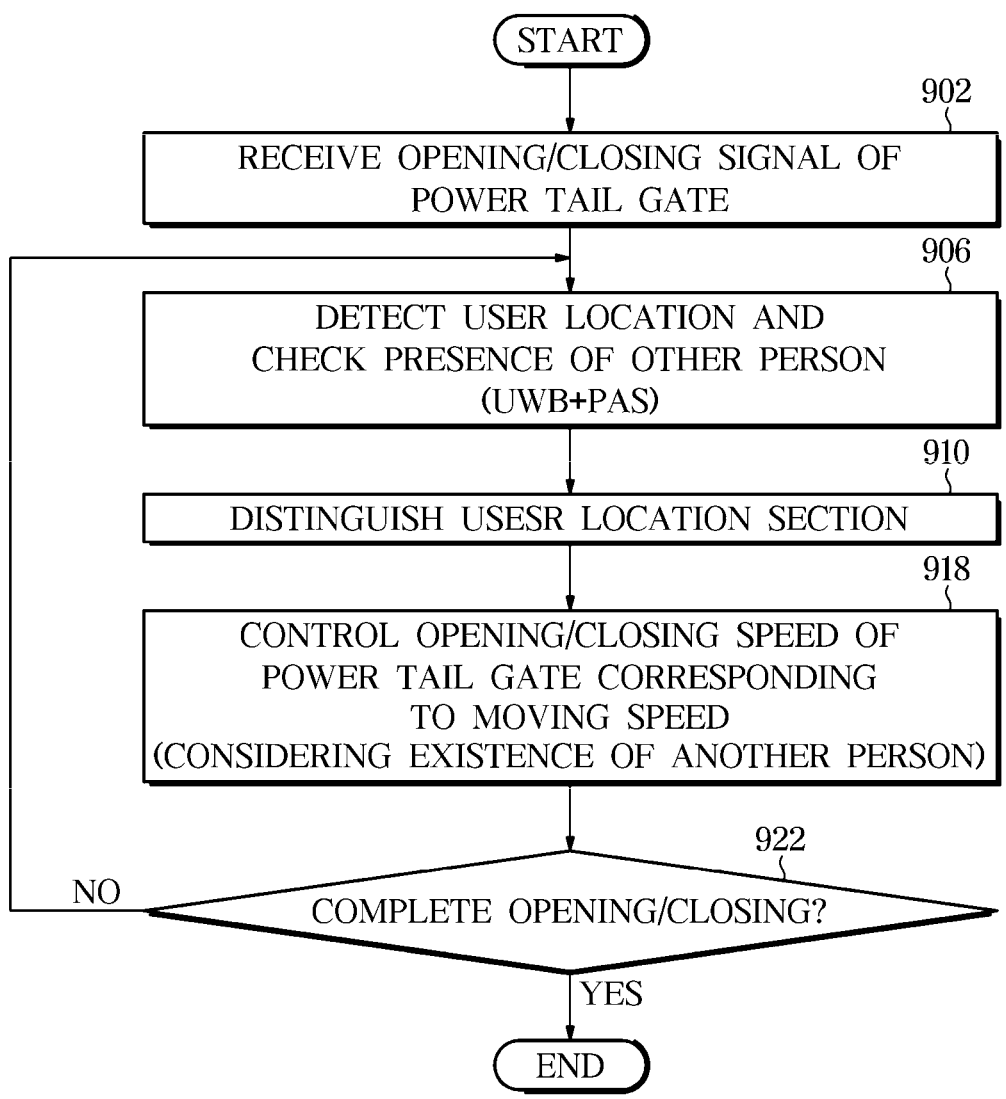
FIG. 9 is a diagram illustrating a fourth embodiment of a vehicle control method according to an embodiment of the present disclosure.

FIG. 9 is a diagram illustrating a fourth embodiment of a vehicle control method according to an embodiment of the present disclosure.

As shown in FIG. 9, the controller 310 receives a power tail gate opening/closing signal generated from the remote controller 106, which is one of the ultra-wideband communicators (902). The power tail gate opening/closing signal generated from the remote controller 106 is a signal generated by the user 250 operating a button of the remote controller 106, or the signal automatically generated by communication made when the remote controller 106 carried by the user 250 approaches within a preset distance from the vehicle 100.

When the power tail gate opening/closing signal generated from the remote controller 106 is received, the controller 310 measures the location (or distance) of the user 250 and also checks whether another person exists behind the vehicle 100 (906). For example, when the power tail gate 102 is driven (open or closed) in response to the reception of the power tail gate opening/closing signal, the rear ultrasonic sensor 330 is activated so that another person exists at the rear of the vehicle 100 Whether or not can be detected. The location (distance) of the user 250 is strictly the location (distance) of the ultra-wideband communicator (e.g., the remote controller 106) carried by the user 250. Here, the distance is a distance between the user 250 and the vehicle 100. The other person may be a person other than the user 250, in particular, a person who does not carry an ultra-wideband communicator. Since the other person does not carry the ultra-wideband communicator, it is more preferable to confirm the existence of the other person using the rear ultrasonic sensor 330 rather than confirming through the ultra-wideband communication.

When the location measurement of the user 250 is completed, the controller 310 determines a section to which the location of the user 250 belongs (910). For example, the controller 310 determines which section of the user 250 is located among the proximity section 202, the near section 204, and the far section 206 shown in FIG. 2.

When the determination of the section in which the user 250 is located is completed, the controller 310 controls the speed of opening or closing of the power tail gate 102 to correspond to the determined section (918). For example, when the user 250 is located within a preset close section 202 from the vehicle 100, the opening or closing speed of the power tail gate 102 is controlled at a preset slow speed. On the contrary, when the user 250 is located within a predetermined distance section 206 from the vehicle 100, the opening or closing speed of the power tail gate 102 is controlled at a preset high speed. If the user 250 is located in the middle section 204 between the near section 202 and the far section 206, the opening or closing speed of the power tail gate 102 is an intermediate speed between a slow speed and a high speed.

Figure 10:
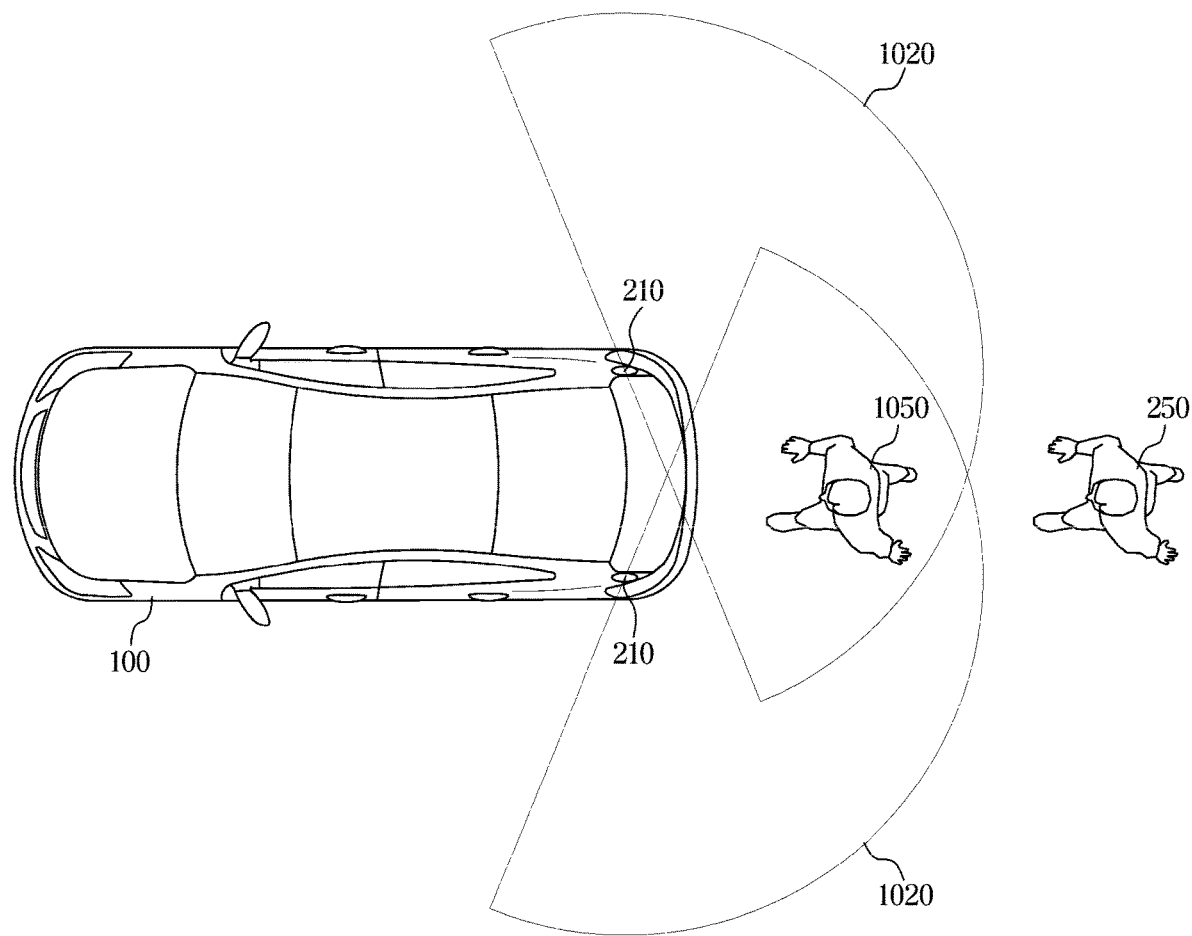
FIG. 10 is a diagram illustrating that another person exists at the rear of a vehicle according to an exemplary embodiment of the present disclosure.

However, in controlling the driving speed of the power tail gate 102, it may be considered whether another person exists behind the vehicle 100. FIG. 10 is a diagram illustrating that another person exists at the rear of a vehicle according to an exemplary embodiment. As shown in FIG. 10, even if the user carrying the ultra-wideband communicator is far enough away from the vehicle 100, when there is another person behind the vehicle 100, since the power tail gate 102 and the other 1050 may collide by driving the power tail gate 102, in order to prevent this collision, it is desirable to stop the driving of the power tail gate 102 or to control the driving speed to be sufficiently slow. Therefore, in step 918 of FIG. 9, the controller 310 controls the opening or closing speed of the power tail gate 102 to correspond to the section in which the user 250 is located. The driving of the power tail gate 102 may be stopped or the driving speed may be controlled to be sufficiently slow in consideration of the presence of another person behind the vehicle 100.

Returning to FIG. 9, when the opening and closing of the power tail gate 102 is completed, the controller 310 ends the opening and closing control of the power tail gate 102 ('Yes' in 922). On the other hand, if the opening and closing of the power tail gate 102 has not yet been completed, the controller 310 returns to the user position measurement step 406 and repeats the following series of processes ('No' in 922).

Through such control, the user's convenience is achieved by appropriately controlling the opening or closing speed of the power tail gate 102 according to the distance between the vehicle 100 and the user 250.

The above description is merely illustrative of the technical idea, and a person of ordinary skill in the technical field of the present invention will be able to make various modifications, changes and substitutions within the range not departing from the essential characteristics. Accordingly, the embodiments disclosed above and the accompanying drawings are not intended to limit the technical idea, but to explain the technical idea, and the scope of the technical idea is not limited by the embodiments and the accompanying drawings. The scope of protection should be interpreted by the scope of the claims below, and all technical ideas within the scope of the same should be construed as being included in the scope of the rights.

According to an aspect of the present disclosure, by controlling the opening or closing speed of the power tail gate in consideration of the user's position when the vehicle's power tail gate is automatically opened or closed, it is possible to prevent the user from contacting the open or closed power tail gate.

Although the present disclosure was described with reference to specific embodiments shown in the drawings, it is apparent to those skilled in the art that the present disclosure may be changed and modified in various ways without departing from the scope of the present disclosure, which is described in the following claims.

What is claimed is:

1. A controlling method of a vehicle, the method comprising:
detecting, by a controller, a location of a user around the vehicle in response to receiving an opening signal and a closing signal for opening and closing a power tail gate of the vehicle, respectively in a state in which the vehicle is stationary;
controlling, by the controller, an opening speed and a closing speed of the power tail gate according to at least one of a distance between the vehicle and the user and a change in direction of the user's approach to the vehicle, when opening and closing the power tail gate respectively in the state in which the vehicle is stationary, in response to receiving the respective opening and closing signals of the power tail gate; and
displaying the opening or closing speed of the power tail gate through a visual or audible output device of the vehicle.

2. The method according to claim 1 further comprising;
controlling the opening speed or the closing speed of the power tail gate to become slower as the distance between the vehicle and the user becomes closer; and
controlling the opening speed or the closing speed of the power tail gate to become faster as the distance between the vehicle and the user becomes farther.

3. The method according to claim 1 further comprising:
recognizing a user's motion; and
based on the user's motion, reducing or increasing the opening speed of the power tail gate or reducing or increasing the closing speed of the power tail gate.

4. The method according to claim 1 further comprising:
calculating a moving speed of the user based on the location of the user; and
based on the moving speed of the user, reducing or increasing the opening speed of the power tail gate or reducing or increasing the closing speed of the power tail gate.

5. The method according to claim 1, wherein the displaying the opening or closing speed of the power tail gate includes:
expressing by turning on and off a light of the vehicle; and
expressing through a speaker or a horn of the vehicle.

6. The method according to claim 1 further comprising:
checking whether a person other than the user presents at a rear of the vehicle; and
stopping opening or closing of the power tail gate or controlling the opening or closing of the power tail gate to be slower when the person is present at the rear of the vehicle.

7. The method according to claim 6, wherein the checking whether a person presents includes detecting a presence of the person by a rear detection sensor of the vehicle.

8. The method according to claim 1, wherein the detecting a location of a user includes detecting the location through an ultra-wideband communication between the vehicle and an ultra-wideband communicator of the user.

9. The method according to claim 1 further comprising;
decreasing the opening speed or the closing speed of the power tail gate when the user changes the direction in a predetermined first order;
increasing the opening speed or the closing speed of the power tail gate when the user changes the direction in a predetermined second order; and
more increasing the opening speed or the closing speed of the power tail gate when the user changes the direction in a predetermined third order.

10. A vehicle, comprising:
a communicator configured to receive an opening signal and a closing signal of a power tail gate of the vehicle; and a controller configured to:
: detect a location of a user around the vehicle in response to receiving the opening or closing signal for opening or closing the power tail gate, respectively,
: control an opening speed and a closing speed of the power tail gate according to at least one of a distance between the vehicle and the user and a change in direction of the user's approach to the vehicle, when opening and closing the power tail gate, respectively, in response to receiving the respective opening and closing signals of the power tail gate, and
: display the opening or closing speed of the power tail gate through a visual output device or an audible output device of the vehicle.

11. The vehicle according to claim 10, wherein the controller is configured to:
: control the opening or closing speed of the power tail gate to become slower as the distance between the vehicle and the user becomes closer, and
: control the opening or closing speed of the power tail gate to become faster as the distance between the vehicle and the user becomes farther.

12. The vehicle according to claim 10, wherein the controller is further configured to:
: recognize a user's motion, and
: reduce or increase the opening speed of the power tail gate or reduce or increase the closing speed of the power tail gate, based on the user's motion recognition result.

13. The vehicle according to claim 10, wherein the controller is configured to:
: calculate a moving speed of the user based on the location of the user, and
: reduce or increase the opening speed of the power tail gate or reduce or increase the closing speed of the power tail gate, based on the moving speed of the user.

14. The vehicle according to claim 10, wherein the opening or closing speed of the power tail gate is expressed by turning on and off lights of the vehicle or expressed through a speaker or a horn of the vehicle.

15. The vehicle according to claim 10, wherein the controller is further configured to:
: check whether a person other than the user presents at a rear of the vehicle; and
: stop opening or closing of the power tail gate or control the opening or closing of the power tail gate to be slower when the person is present at the rear of the vehicle.

16. The vehicle according to claim 15, further comprising a rear detection sensor configured to detect a presence of the person at the rear of the vehicle.

17. The vehicle according to claim 10, wherein the location of the user is detected through an ultra-wideband communication between the vehicle and the ultra-wideband communicator of the user.

18. The vehicle according to claim 10, wherein the controller is further configured to:
: decrease the opening speed or the closing speed of the power tail gate when the user changes the direction in a predetermined first order;
: increase the opening speed or the closing speed of the power tail gate when the user changes the direction in a predetermined second order; and
: more increase the opening speed or the closing speed of the power tail gate when the user changes the direction in a predetermined third order.

19. A controlling method of a vehicle, the method comprising:
: communicating with an ultra-wideband communicator of a user through ultra-wideband communication;
: detecting a location of the user having the ultra-wideband communicator around the vehicle through the ultra-wideband communication in response to an opening or closing signal for opening or closing a power tail gate of the vehicle, respectively, generated from the ultra-wideband communicator;
: controlling an opening speed and a closing speed of the power tail gate according to at least one of a distance between the vehicle and the user and a change in direction of the user's approach to the vehicle, when opening and closing the power tail gate, respectively, in response to the respective opening signal and the closing signal; and
: displaying the opening or closing speed of the power tail gate through a visual or audible output device of the vehicle.

20. The method according to claim 19 further comprising;
: decreasing the opening speed or the closing speed of the power tail gate when the user changes the direction in a predetermined first order;
: increasing the opening speed or the closing speed of the power tail gate when the user changes the direction in a predetermined second order; and
: more increasing the opening speed or the closing speed of the power tail gate when the user changes the direction in a predetermined third order.

21. A vehicle, comprising:
: a communicator configured to:
:: communicate with an ultra-wideband communicator of a user through ultra-wideband communication, and
:: receive opening and closing signals of a power tail gate of the vehicle; and
: a controller configured to:
:: detect a location of the user having the ultra-wideband communicator around the vehicle through the ultra-wideband communication in response to receiving the opening or closing signal for opening or closing the power tail gate, respectively, generated from the ultra-wideband communicator,
:: control an opening speed and a closing speed of the power tail gate according to at least one of a distance between the vehicle and the user and a change in direction of the user's approach to the vehicle, when opening and closing the power tail gate, respectively, in response to receiving the respective opening and closing signals of the power tail gate,
:: control an opening or closing speed of the power tail gate to become slower as a distance between the vehicle and the user becomes closer,
:: control the opening or closing speed of the power tail gate to become faster as the distance between the vehicle and the user becomes farther; and
:: display the opening or closing speed of the power tail gate through a visual or audible output device of the vehicle.

22. The vehicle according to claim 21, wherein the controller is further configured to:
: decrease the opening speed or the closing speed of the power tail gate when the user changes the direction in a predetermined first order;
: increase the opening speed or the closing speed of the power tail gate when the user changes the direction in a predetermined second order; and more increase the opening speed or the closing speed of the power tail gate when the user changes the direction in a predetermined third order.

23. A vehicle, comprising:

a communicator configured to receive an opening signal and a closing signal of a power tail gate of the vehicle; and a controller configured to:

detect a location of a user around the vehicle in response to receiving the opening or closing signal for opening or closing the power tail gate, respectively, control an opening speed and a closing speed of the power tail gate according to at least one of a distance between the vehicle and the user and a change in direction of the user's approach to the vehicle, when opening and closing the power tail gate, respectively, in response to receiving the respective opening and closing signals of the power tail gate, and display the opening or closing speed of the power tail gate through a visual output device or an audible output device of the vehicle, wherein the location and the direction of the user is detected through an ultra-wideband communication between the vehicle and an ultra-wideband communicator of the user.

* * * * *